United States Patent [19]

Hardin

[11] Patent Number: 5,651,251

[45] Date of Patent: Jul. 29, 1997

[54] GEOTHERMAL ENERGY MEANS AND PROCEDURE

[76] Inventor: James R. Hardin, 4257 Eagle Bay West Dr., Indianapolis, Ind. 46254

[21] Appl. No.: 600,291

[22] Filed: Feb. 12, 1996

[51] Int. Cl.⁶ .................................................. F03G 7/00
[52] U.S. Cl. ................................. 60/641.2; 60/641.4
[58] Field of Search ........................ 60/641.2, 641.4; 165/45

[56] References Cited

U.S. PATENT DOCUMENTS 3,965,972  6/1976  Petersen ........................ 165/45
4,054,175  10/1977  Swearingen ..................... 60/641.2
4,448,237  5/1984  Riley ............................ 165/45
4,461,157  7/1984  Shapess ......................... 165/45

*Primary Examiner*—Denise L. Ferensic
*Assistant Examiner*—Alfred Basichas
*Attorney, Agent, or Firm*—Robert A. Spray

[57] ABSTRACT

The water in a closed loop geothermal system is caused to flush the system by reverse flow of water in and through the system. This provides a "well-to-well" full reversal of the water flow, thus permitting the factor of a primary receiver well to not only receive the geothermally used water from the primary well, but for that receiver well to then serve as an aquifer subsequently for causing the flow to go back to the primary well.

3 Claims, 1 Drawing Sheet

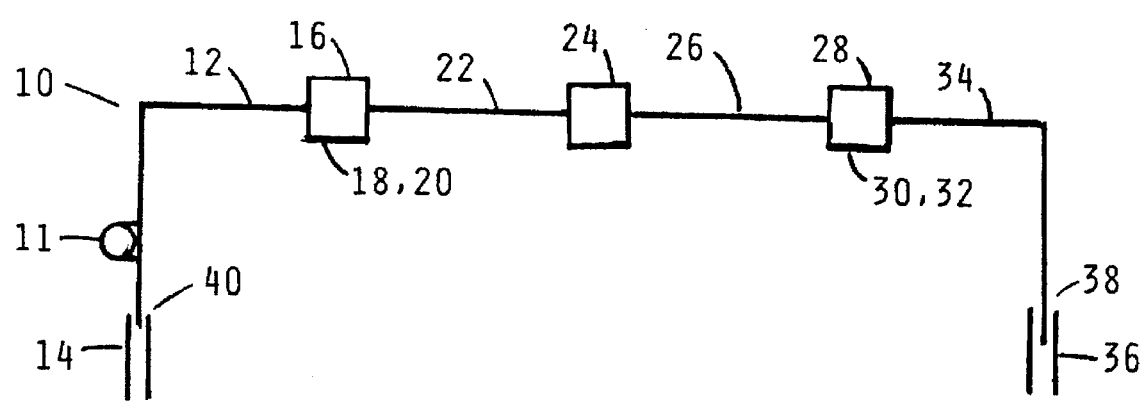

GEOTHERMAL ENERGY MEANS AND PROCEDURE

I. FIELD AND USEFULNESS OF THE INVENTION, BRIEFLY

The present invention relates to an installation of a so-called "closed loop" nature, and more particularly to a means and procedure for improving the efficiency of a closed loop geothermal energy system.

Still more particularly, the concepts provide a means for increasing the efficiency of such a closed loop geothermal system by an economical means of "reverse cycling" of the water of the geothermal loop, providing an economical procedure which keeps all or substantially all of the water of the loop, but with a reverse cycle procedure which achieves a flushing of the loop conduits and the treating facilities of the loop, by using two or more wells cyclically as aquifers/receivers.

II. PROBLEM AND OTHER FACTORS INHERENT IN A CLOSED LOOP GEOTHERMAL ENERGY SYSTEM

Closed loop geothermal energy systems and installations are not new as installations, and for several years have been becoming more popular in such advantageous uses as "heat pumps", which are installations which utilize the relatively constant temperature of underground water sources for both heating and cooling purposes for for buildings by a heat-exchanger unit by which heat energy from an underground source or a cooler temperature water from an underground source is used for heating and/or cooling a building, respectively, by water cycling through the system of a closed loop nature and including heat exchanger means.

That is, e.g., in the summer the water is heated in the air-conditioning procedure and then the heated water is cooled by passing through the underground portion of the geothermal loop; and conversely in the winter the relatively warm water of the underground source is caused by a heat exchanger installation to give up heat energy in the heat exchanger.

The closed loop nature of the system has advantages, but it also has a disadvantage of a cyclical build-up of waste products, such as precipitated matter, particulate matter such as sand, and whatever may be the contaminates coming into the system from whatever source.

The contamination effect, however caused, is such that the efficiency and volumetric effectiveness of the system is continually worsened, no matter how gradually as the particulate and/or precipitated contaminants gradually build up in the system's conduits and/or filtering or other treatment units of the system.

To rid the system of the deleterious contaminants, thus to minimize their build-up and hopefully to fully cleanse the system, assuming that the underground water table is sufficiently volumetric that loop-cleansing is justified, the practice has been to insert a pumping means into the primary water receiver well, and then to achieve a reverse flow of water through the injection opening of that well with rented or contracted equipment for temporary use of repeated nature, and to pay well specialists to come to the site to give a flush-out type of procedure. Such is quite expensive, and causes a lot of "downtime" of the equipment. Moreover, a gradually-increased inefficiency of a system is usually tolerated for an indefinite length of time prior to the hiring of a contractor to come in to do this work at the building site.

Large-scale use of well water, pond water, or other ground sources of heat sink, often referred to as "geothermal" or "ground source" energy, seems to have several inherent problems which this invention overcomes, at least to a significant extent:

1. There may not be enough ground (well) water available to support geothermal needs, to the extent or flow rate needed in a particular installation of large-scale needs;

2. The available ground water may have an undue amount of chemicals or other pollution factors which make its treatment difficult, e.g., dissolved iron oxide in solution but which participates out in the use of water from the ground source, and other earth-carried factors;

3. There may be little opportunity for discharging the ground water after its geothermal use, due to lack of discharge availability, even if the geothermal use has not been highly detrimental to the water;

4. Other types of reinjection wells are of problematic nature, i.e., requiring extensive and expensive maintenance;

5. Due to existing pollution, it may not be legal or desirable to reinject the water into injection (discharge) wells.

This invention provides a solution to the above-mentioned problems, and may provide related advantages depending on the nature, condition, and availability of conveniently accessable wells and their adjacent water tables.

III. THE INVENTION SYSTEM AND PROCESS IN BRIEF SUMMARY

In carrying out the invention in a preferred embodiment, the invention provides a permanently installed control means by which the water in a closed loop geothermal system may be caused to flush the system by reverse flow of water in the system. Means are provided for control of the flushing-cycle means so that the precipitates and particulate matter are dislodged and flushed from the system, without having to call in outside contractors for a task which is relatively expensive due to the need for specialized equipment on a contracted or a rental basis, etc.

This provides a "well-to-well" full reversal of the water flow, thus permitting the factor of a primary receiver well to not only receive the geothermally used water from the primary well, but for that receiver well to then serve as an aquifer subsequently for causing the flow to go back to the primary or first well.

This reversal of flow may be done at the option of the user, e.g., between changes of climate as a means of better efficiency of utilization of the heat output or input at the heat exchanger stage or at other times as may be needed to cleanse the conduit for better efficiency.

IV. PRIOR ART CAPABILITY AND MOTIVATIONS, AS HELPING TO SHOW PATENTABILITY HERE

Even in hindsight consideration of the present invention to determine its inventive and novel nature, it is not only conceded but emphasized that the prior art had many details usable in this invention, but only if the prior art had had the guidance of the present concepts of the present invention, details of both capability and motivation.

That is, it is emphasized that the prior art had/or knew several particulars which individually and accumulatively show the non-obviousness of this combination invention. E.g., (a) Hydraulic circuitry, and specifically water conduit systems and networks, have long been in worldwide use;

(b) The nature of ground water deposits of various types, their practically inexhaustable quantity, their nearly uniform mean temperatures, etc., have been long known;

(c) The installation of water conduit systems has been already done in many locations, and in many natures of use, and the geothermal effect of water as caused to pass through heat exchanger components of various installations has long been used;

(d) Various problems have long been known as to geothermal energy systems, and in particular geothermal energy systems involving a difficulty of either discharging the water after geothermal use, or discharging such water into a reinjection hole;

(e) The ease of tooling for the present invention has surely given manufacturers ample incentive to have made modifications for commercial competitiveness in a competitive industry, if the concepts had been obvious for a geothermal system.

(f) The prior art has always had sufficient skill to make many types of water conduit systems and features, more than ample skill to have achieved the present invention, but only if the concepts and their combination had been conceived for a geothermal system.

(g) Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieve this advantageous invention;

(h) The details of the present invention, when considered solely from the standpoint of construction, are exceedingly simple, basically water conduit and related hardware available for various hydraulic installations; and the matter of simplicity of construction has long been recognized as indicative of inventive creativity;

(i) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and (j) The predictable benefits from a novel geothermal installation and procedure having the features of this invention would seem sufficiently high that others would have been working on this type of installation, but only if the concepts which it presents had been conceived, giving a reverse flow through the full geothermal system's circuit.

Accordingly, although the prior art has had capability and motivation, amply sufficient to presumably give incentive to the development of an installation and procedure according to the present invention, the fact remains that this invention awaited the creativity and inventive discovery of the present inventor. In spite of ample motivation and capability shown by the many illustrations herein, the prior art did not suggest this invention of a well-to-well flow-reversing concept.

V. PRIOR ART AS PARTICULAR INSTANCES OF FAILURE TO PROVIDE THIS NOVEL INSTALLATION AND PROCEDURE

In view of the disadvantages of having to contract for reverse flush-out of a geothermal energy loop system, and in view of the advantages of having a permanent flush-out capability as an effectively integral feature of a geothermal energy loop system and in view of the general economic advantages, ecological advantages, etc., of the present invention, it may be difficult to realize that the prior art has not conceived of the combination purpose and achievement of the present invention, even though water conduits and systems of conduits are relatively common and widespread installations, and the water supply industry, like other industries, can use improvements in various aspects. Further, persons knowledgable with respect to water field circuitry surely include an uncountable multitude of persons, at least of sufficient experience, skill, etc., that the present invention would have been desired and attempted long ago, but only if its factors and combination-nature had been obvious as providing economy and efficiency in a geothermal system.

The consideration of the nature of the present inventive concepts may be helped by a summarized consideration of the prior art as known to the inventor; however, as water conduit uses and installations are so well known and universally known and used, merely generalized reminders as to them as diverse and well-known prior art seem sufficient.

That is, water conduit installations have been known and used, and surely could have been modified toward the present invention for many scores of years if the present improvement had been obvious as a full well-to-well reverse cycle combination concept.

Further, as to water conduit systems and geothermic functioning as a function of capability, nothing is here asserted to be novel; and, in contrast, the concepts of the present invention provide the building upon the principal nature and function of water conduit systems, rather than any modification of their function.

Various types of water conduit installations are of course here conceded, but the general nature of prior art water conduit systems does not provide the overall combination of features of the present invention. Such systems known to the inventor are so-called heat pump installations, as the least remote from the present invention; but even they do not have the reverse flow flushout concept with primary and secondary well aquafiers.

VI. SUMMARY OF THE PRIOR ART'S LACK OF SUGGESTIONS OF THE CONCEPTS OF THE INVENTION'S COMBINATION

In spite of all such factors of the prior art knowledge and use, the problem here solved awaited this inventor's consideration, ideas, and creativity. More particularly, as to the novelty here of the invention as considered as a whole, a consideration of the prior art uses and needs helps show its contrast to the concepts, and emphasizes the advantages, novelty, and the inventive significance of the present concepts as are here shown, particularly as to utility and economy of use as detailed herein, as to apparatus and a procedure; and flush-out cleansing is a prior art procedure.

Moreover, prior art systems and installations, such as heat pumps, as known to this inventor, which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and to its provisions.

And the existence of such prior art knowledge and related ideas embodying such various features is not only conceded, it is emphasized; for as to the novelty here of the combination, of of the invention as considered as a whole, a contrast to the prior art helps also to remind of needed improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in a combination, which provides the merits of this invention, even though certain details are shown separately from this accomplishment as a combination in a geothermal system which provides reverse flow operativity features.

And the prior art's lack of an invention of an economical apparatus achieving the economy and ecology characteristics and other advantages of the present invention, which are goals only approached by the prior art, must be recognized as being a long-felt need fulfilled.

Accordingly, the various concepts and components are conceded and emphasized to have been widely known in the prior art as to various installations; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

VII. BRIEF DESCRIPTION OF THE DRAWING

The above description of the novel and advantageous invention is of somewhat introductory and generalized form. More particular details, concepts, and features are set forth in the following and more detailed description of an illustrative embodiment, taken in conjunction with the accompanying Drawing, which is of quite schematic and flow diagrammatic nature for showing the inventive concepts.

VIII. DETAILED DESCRIPTION OF THE INVENTION AS A "WATER WELL TO WATER WELL" INSTALLATION

As shown in the Drawings, in the invention the installation 10 is such that water for geothermal loop use is pumped by pump 11 through a circuit portion 12 from primary ground source well(s) 14, as a primary aquifer source 14, through a processing stage 16 of optional treatment units 18 and filters 20 as may be needed in the particular installation.

The components of stage 16 are to be selected appropriately, depending upon the contaminants and nature of the ground source 14 water, the ultimate needs, the flow rate needed, etc.; but the pump means 11 is reversible as noted herein.

The water cleansed at stage 16 is then piped through conduit 22 to and through heat exchanger(s) 24, at which the water stream's thermal energy(heat) is either discharged or increased, depending on the particular geothermic use of the system.

That is, heat units are added or received in the heat exchanger process of a cooling (air-conditioning) use, or removed or discharged in a heat exchanger's heating use.

Then the water is led from the heat exchanger(s) 24 by a conduit 26 to a secondary or subsequent stage 28 of treatment units 30 or filters 32 as needed.

(The system's individual elements such as treatment units, filters, heat exchanger components, and other elements of the geothermal loop use are not a part of the present invention, except as links in the chain of the geothermic loop.)

The re-cleansed water from the treatment and filter stage 28 is directed by conduit 34 to secondary well(s) 36, where it is led to return to the same aquifer source 14 or optionally other well(s), as may be a conveniently available, different aquifer source 36, through an injection hole 38.

Then, whether this invention is being used with the second source 36 as different from the source 14, the flow is caused to be reversed through a reverse cycle, i.e., from well(s) 36 or well(s) 14 to well(s) 14 in a reverse direction, thus through conduits 34,26,22, and 12 instead of 12,22,26 and 34, through an injection hole 40.

In either direction of the reversable flow, it will be noted that there is a treatment/filter unit(s) both upstream and downstream with respect to the heat exchanger(s).

IX. SUMMARY OF COMPONENTS AND OPERATIONAL DETAILS, AND THEIR ADVANTAGES

As advantages provided by the invention, they are advantages in both concept and in component parts and features; for in contrast to other systems known to the inventor as to the prior art mentioned, the invention provides advantageous features which should be considered, both as to their individual benefit, and to whatever may be considered to be also their synergistic benefit toward the invention as a whole. Such features include the following, as generally related examples:

(a) A reduced cost of cleaning of the overall system, particularly the cleaning of the injection hole(s), of sediments and precipitants;

(b) The reduced cost of cleaning may make the use of an injection well system more practical;

(c) Particularly in regions where the water table is limited, and thus is in jeopardy, or is otherwise controlled, the water after its use for its geothermal purpose may be advantageously returned to the water table;

(d) The return cycle of the geothermal-use water can achieve a recovery of its energy change achieved in the heat exchanger(s) of the system;

(e) The treatment of the water after the flow in heat exchanger use in one direction may sufficiently remedy the need factors as to water if the water table has been polluted, especially advantageous in regions where the natural and/or man-caused pollution cannot be fully remedied;

(f) The injection level is at the same gravity level as the pumping level (with the exception of coning or dipping effects due to pumping and injection activities in the wells) so total loop pumping efficiency is high;

(g) Overall efficiency of the system is increased;

(h) The treatment of water in both directions of flow seems to insure an increasing and accumulative amount and effect of cleansing and purification of the water table for both wells;

(i) The system provides a practicality of a well system in regions in which it was not previously considered feasible to discharge the water after its geothermal use;

(j) Provide more economical utilization of water fields, particularly advantageous for users who would have limited access to ground source areas;

(k) Water is not permanently removed from the aquifer(s), for unless it is used for non-geothermal use or purposely discharged, it is re-cycled;

(l) Water can be decontaminated prior to its return to the original aquifer, thus at least partially cleaning or purifying the water table of the site;

(m) Because of the filtering, water does not quickly "plug" the primary source well nor the injection hole of the primary receiver well;

(n) Reversing the flow, in other words, provides effective cleaning and maintenance of the wells without the added cost of separate maintenance; and (o) Waste heat, for example, as unwanted from summer cooling operations, can be recovered and used for winter heating operations, by simply reversing the well flow to match the corresponding needs.

The advantageous features are all related to the basic concept of reversing of the flow through the geothermal system, using the effect of the combination of two wells and two injection features, both repeatedly cleaned by the reversal procedure.

X. CONCLUSION AS TO INVENTIVE COMBINATION

As detailed herein, with the basic concept of reversal of flow, particularly cyclically according to prevailing climate conditions not only of summer and winter but if desired as also to spring and fall, the combination of reversed flow inventive concepts and details herein set forth provides novel concepts of a desirable and usefully advantageous installation and procedure, yielding advantages which are and provide special and particular advantages when used as herein set forth.

In summary as to the advantageous details of the reversed flow concepts, their novelty and inventive nature is shown by novel features of concept and construction shown here in advantageous combination and by the novel concepts hereof not only being different from all the prior art known, even though other water systems have been known and used for scores of years, but because the achievement is not what is or has been suggested to those of ordinary skill in the art, especially realistically considering this as a novel combination comprising components which individually are similar in nature to what is well known to most all persons, surely including most of the many technicians and professionals of water-delivery systems and apparatus for a great number of years, throughout the entire world. No prior art component or element has even suggested the modifications of any other prior art to achieve the particulars of the novel concepts of the overall combination here achieved, with the special advantages which the overall combination system provides; and this lack of suggestion by any prior art has been in spite of the long worldwide use of water delivery systems, public and privately operated.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world, and the invention's non-technical nature.

Quite certainly this particular combination of prior art details as here presented in this overall combination has not been suggested by the prior art, this achievement in its particular details and utility being a substantial and advantageous departure from prior art, even though the prior art has had somewhat similar systems for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art not achieving particular advantages here achieved by this combination.

Accordingly, it will thus be seen from the foregoing description of the invention according to these illustrative embodiments, considered with the accompanying drawings, that the present invention provides new and useful concepts of a novel and advantageous system and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments, or form or arrangement of parts herein described or shown.

For example, although the primary and secondary wells are generally referred to herein as separate aquifers, they are not necessarily fully separate, for indeed most adjacent water tables are connected to some extent; and, moreover, the discharge from the first well may indeed be directed back to the first well. Nevertheless, in either case, the concepts apply to a reversal of flow throughout the full system.

What is claimed:

1. An operational procedure for a geothermal energy means, the geothermal energy means having a water treatment means in a conduit from a ground water source first aquifer means to a second aquifer means, the conduit extending between the first aquifer means and the second aquifer means, and accommodating water flow in the conduit, there being a heat exchanger in the conduit operative to receive or discharge heat energy respectively into or from the conduit in geothermal operation of the installation, there being provided a second water treatment means in the conduit leading operatively between the heat exchanger and the second aquifer means, and reversing the flow of water to travel in the opposite direction through the conduit and the second treatment means, the heat exchanger, and the first treatment means, back to the ground water source first aquifer means, said conduit accommodating the water flow from the first aquifer means to the second aquifer means, and the water flow from the second aquifer means to the first aquifer means, whether or not there is communication, other than through said conduit, between the first aquifer means and the second aquifer means.

2. A geothermal energy means for a geothermal energy installation having a water treatment means in a conduit from a ground water source first aquifer means to a second aquifer means, the conduit extending between the first aquifer means and the second aquifer means, and accommodating water flow in the conduit, there being a heat exchanger in the conduit operative to receive or discharge heat energy respectively into or from the conduit in geothermal operation of the installation, the improvement comprising means for reversing the flow of water to travel in the opposite direction through the conduit and the treatment means and the heat exchanger, back to the ground water source first aquifer means, said conduit accommodating the water flow from the first aquifer means to the second aquifer means, and the water flow from the second aquifer means to the first aquifer means, whether or not there is communication, other than through said conduit, between the first aquifer means and the second aquifer means.

3. The geothermal energy means according to claim 1, in a combination in which there is a second treatment means operatively provided in the conduit, the second treatment means being between the heat exchanger and the second aquifer means, and the water-flow reversing means causes flow of water through said second treatment means upstream of the heat exchanger during the reverse-flow of water achieved by the water-flow reversing means.

* * * * *

UNITED STATES PATENT AND TRADEMARK OFFICE
CERTIFICATE OF CORRECTION

PATENT NO. : 5,651,251
DATED : July 29, 1997
INVENTOR(S) : James R. Hardin

It is certified that error appears in the above-identified patent and that said Letters Patent is hereby corrected as shown below:

Col. 2, line 30;  Change "INVENTION" to:  -- "INVENTIVE" --.

Col. 10, line 8;  Change the dependence reference numeral "1" to "2".

Signed and Sealed this

Thirtieth Day of December, 1997

Attest:

BRUCE LEHMAN

Attesting Officer

Commissioner of Patents and Trademarks